US012608001B2

(12) United States Patent
   Ohira et al.

(10) Patent No.: US 12,608,001 B2
(45) Date of Patent: Apr. 21, 2026

(54) APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Shinji Ohira, Tokyo (JP); Makoto Tomioka, Kanagawa (JP); Daisuke Kotake, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 17/512,294

(22) Filed: Oct. 27, 2021

(65) Prior Publication Data

US 2022/0137626 A1    May 5, 2022

(30) Foreign Application Priority Data

Nov. 4, 2020   (JP) ................................. 2020-184617
Aug. 23, 2021  (JP) ................................. 2021-135585

(51) Int. Cl.
   *G05D 1/00*       (2006.01)
   *G06T 7/73*       (2017.01)
   *G01S 17/08*      (2006.01)

(52) U.S. Cl.
   CPC .............. *G05D 1/021* (2013.01); *G06T 7/73* (2017.01); *G01S 17/08* (2013.01); *G06T 2207/10012* (2013.01); *G06T 2207/30252* (2013.01)

(58) Field of Classification Search
   CPC .. G06V 20/588; G01C 21/28; G01C 21/3602; G01C 21/3848; G01C 21/1652;
   (Continued)

(56) References Cited

U.S. PATENT DOCUMENTS 6,289,282 B1 *  9/2001  Hassler ................. G01S 13/931
                                                    701/96
9,221,396 B1 * 12/2015  Zhu ......................... G08G 1/163
                    (Continued)

FOREIGN PATENT DOCUMENTS

JP       2019197350 A    11/2019
JP       2020017173 A     1/2020
WO    WO2020092635    *   5/2020

OTHER PUBLICATIONS

Wenbo Dong, et al.; "A Novel Method for the Extrinsic Calibration of a 2D Laser Rangefinder and a Camera;" Aug. 31, 2018; pp. 1-12.

*Primary Examiner* — Vivek D Koppikar
*Assistant Examiner* — Jeffrey R Chalhoub
(74) *Attorney, Agent, or Firm* — Canon U.S.A., Inc. IP Division

(57)        ABSTRACT

Difference information between a first element of a vehicle estimated in accordance with measurement information acquired by a first sensor and a second element of the vehicle acquired simultaneously with the first element is acquired. The difference information is according to the same coordinate system as the first element and the second element. An element for controlling movement of the vehicle is selected from the first element and the second element. When the element for controlling movement of the vehicle is switched to another element of the first element and the second element, the other element selected is corrected by using the difference information.

19 Claims, 7 Drawing Sheets

(58) Field of Classification Search
CPC .... G01C 21/3623; G01C 25/00; G01C 17/38;
G01C 21/10; B60W 2420/408; B60W
2556/50; B60W 60/0059
See application file for complete search history.

(56) References Cited

U.S. PATENT DOCUMENTS

| | | | | |
|---|---|---|---|---|
| 9,555,740 | B1 * | 1/2017 | Zhu | G01D 18/00 |
| 9,558,601 | B2 * | 1/2017 | Lu | B64F 5/60 |
| 9,840,253 | B1 * | 12/2017 | Prasad | B60W 30/12 |
| 9,927,813 | B1 * | 3/2018 | Ferguson | G01S 7/4004 |
| 10,175,355 | B2 * | 1/2019 | Fukuman | G01S 15/878 |
| 10,210,435 | B2 * | 2/2019 | Fukuman | G06F 18/256 |
| 10,436,900 | B2 * | 10/2019 | Fukuman | G01S 15/878 |
| 10,451,734 | B2 * | 10/2019 | Fukuman | G01S 7/527 |
| 10,453,343 | B2 * | 10/2019 | Fukuman | G01S 15/46 |
| 11,321,210 | B2 * | 5/2022 | Huang | G06F 11/3006 |
| 11,327,155 | B2 * | 5/2022 | Nemati | G01S 13/86 |
| 11,327,169 | B2 * | 5/2022 | Jeon | G01S 13/931 |
| 11,453,407 | B2 * | 9/2022 | Hu | G06V 20/56 |
| 11,474,202 | B2 * | 10/2022 | Alvarez | G01S 13/865 |
| 11,526,175 | B1 * | 12/2022 | Christie | G06V 20/56 |
| 11,550,322 | B1 * | 1/2023 | Christie | G05D 1/628 |
| 2013/0336539 | A1 * | 12/2013 | Hirai | G06T 7/74 |
| | | | | 382/106 |

| | | | | |
|---|---|---|---|---|
| 2016/0116585 | A1 * | 4/2016 | Fukuman | G01S 15/878 |
| | | | | 367/99 |
| 2016/0288799 | A1 * | 10/2016 | Nguyen Van | G01S 13/931 |
| 2017/0008487 | A1 * | 1/2017 | Ur | B60R 25/102 |
| 2017/0169627 | A1 * | 6/2017 | Kim | G01S 13/862 |
| 2017/0363423 | A1 * | 12/2017 | Dormody | G01C 17/38 |
| 2018/0040171 | A1 * | 2/2018 | Kundu | G07C 5/0808 |
| 2018/0111613 | A1 * | 4/2018 | Oh | G05D 1/0238 |
| 2018/0362051 | A1 * | 12/2018 | Hu | B60W 60/00186 |
| 2019/0138423 | A1 * | 5/2019 | Agerstam | G06F 11/3466 |
| 2019/0285726 | A1 * | 9/2019 | Muto | G01S 7/40 |
| 2019/0389599 | A1 * | 12/2019 | Dillard | G07C 5/0825 |
| 2020/0124421 | A1 * | 4/2020 | Kang | G01S 17/06 |
| 2020/0209853 | A1 * | 7/2020 | Leach | G01S 7/4972 |
| 2020/0300967 | A1 * | 9/2020 | Demerly | G01S 17/931 |
| 2020/0331484 | A1 * | 10/2020 | Rodriguez Bravo | G07C 5/008 |
| 2021/0094490 | A1 * | 4/2021 | Christie | G05D 1/0088 |
| 2021/0163021 | A1 * | 6/2021 | Frazzoli | H04W 4/48 |
| 2021/0174516 | A1 * | 6/2021 | Kang | G06V 10/454 |
| 2021/0182576 | A1 * | 6/2021 | Kuriyama | H04W 4/40 |
| 2021/0309231 | A1 * | 10/2021 | Fujita | G01C 21/3407 |
| 2021/0394795 | A1 * | 12/2021 | Hayes | G06N 5/04 |
| 2021/0397854 | A1 * | 12/2021 | Brizzi | G06V 20/56 |
| 2022/0289245 | A1 * | 9/2022 | Kuriyama | B60W 60/00186 |
| 2022/0309698 | A1 * | 9/2022 | Takahashi | B64C 39/024 |
| 2022/0324488 | A1 * | 10/2022 | Yuki | G08G 1/16 |

* cited by examiner

APPARATUS, METHOD, AND NON-TRANSITORY COMPUTER-READABLE STORAGE MEDIUM

BACKGROUND OF THE DISCLOSURE

Field of the Disclosure

The aspect of the embodiments relates to a technology of estimating the position of a vehicle in accordance with measurement information.

Description of the Related Art

In one technology, a vehicle is equipped with a sensor for measuring the distance between an object existing in an environment and the sensor, and the position of the vehicle is estimated in accordance with measurement information acquired by the sensor. When a vehicle is equipped with a plurality of sensors, the sensors are switched in accordance with the situation to use the estimated position of the vehicle, and as a result, the position of the vehicle can be more accurately estimated. At this time, each sensor estimates the position in an individual manner. Thus, to use the position to control movement of the vehicle, the sensors are to be matched to each other with respect to position; in other words, the sensors are to use the same coordinate system. In W. Dong, et al., "A Novel Method for the Extrinsic Calibration of a 2D Laser Rangefinder and a Camera", ICRA'17, 2017 (Non-patent literature 1), the positional relationship between a camera and a laser sensor is previously measured, so that the position and orientation measured by the camera and the position and orientation measured by the laser sensor can be managed in the same coordinate system.

However, even when the positional relationship between sensors is calibrated by using the method in Non-patent literature 1, the position and orientation may differ due to errors in measurement by the sensors. To deal with the unreal difference, the vehicle may move in unstable manner.

SUMMARY OF THE DISCLOSURE

According to an aspect of the embodiments, an apparatus includes a first acquisition unit, a second acquisition unit, a selection unit, a difference acquisition unit, and a correction unit. The first acquisition unit is configured to acquire a first element about a vehicle estimated in accordance with input information from a first sensor fixed to the vehicle. The second acquisition unit is configured to acquire a second element about the vehicle estimated in accordance with input information from a second sensor fixed to the vehicle. The selection unit is configured to select an element for controlling movement of the vehicle from the first element and the second element according to the same coordinate system. The difference acquisition unit is configured to acquire difference information between the first element and the second element acquired simultaneously with the first element. The difference information is according to the same coordinate system. The correction unit is configured to, when the element selected by the selection unit is switched to another element of the first element and the second element, correct the other element selected by the selection unit to be closer to the element selected before the switching, by using the difference information acquired by the difference acquisition unit.

Further features of the disclosure will become apparent from the following description of exemplary embodiments with reference to the attached drawings.

BRIEF DESCRIPTION OF THE DRAWINGS

FIG. 2 is a block diagram illustrating an example of a functional configuration of an information processing apparatus.

FIG. 3 illustrates an example of a hardware configuration of the information processing apparatus.

DESCRIPTION OF THE EMBODIMENTS

First Embodiment

Figure 1:
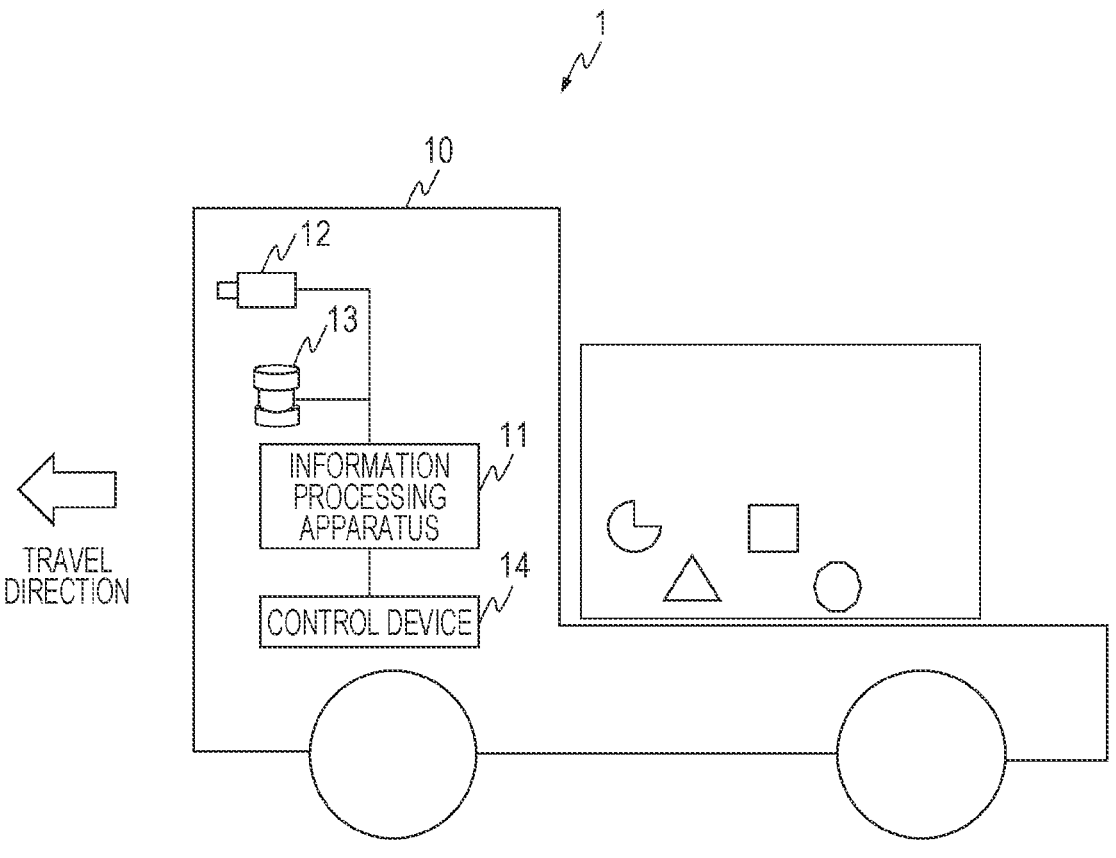
FIG. 1 illustrates an example of a system configuration of an information processing system.

This embodiment describes an information processing system including a vehicle equipped with an image sensor and a distance sensor. Specifically, the vehicle is an automated guided vehicle (AGV), or self-driving vehicle. This system estimates two kinds of position and orientation of the vehicle in accordance with information inputted from the image sensor and information inputted from the distance sensor. It is not always possible to estimate two kinds of position and orientation; when the system fails to estimate one kind of position and orientation, the system switches to the other kind of position and orientation, and the other kind of position and orientation is used to control movement of the vehicle. Inputting the estimation result of one kind of position and orientation suffices to control movement of the vehicle. In the present embodiment, priority is given to the position and orientation estimated by using the image sensor to control movement of the vehicle. When the position and orientation cannot be estimated in accordance with the information inputted from the image sensor, the system uses the position and orientation estimated in accordance with the information inputted from the distance sensor. Needless to say, conversely, it is possible to give priority to the position and orientation estimated by using the distance sensor. On the basis of, for example, the reliability level of the position and orientation estimated in accordance with the sensors, it is predetermined which sensor is prioritized to estimate the position and orientation. In the present embodiment, priority is given to the position and orientation estimated by using the image sensor. When the image sensor is switched to the distance sensor to acquire an estimation result of position and orientation while the vehicle moves, the estimated position and orientation may differ. As a result, the vehicle may move in an unexpected manner; for example, the vehicle may suddenly change the direction to return to the position and orientation before the switching. To address this problem, the present embodiment describes a method in which the difference in position and orientation between two sensors is previously calculated, and the position and orientation is corrected when the two sensors are switched, in accordance with, for example, the difference at the time of switching. The position and orientation expected to be estimated by using the image sensor before switching is calculated by using the position and orientation estimated by using the distance sensor after switching and the difference. The positional relationship between the image sensor and the distance sensor is previously calculated, and on the basis of the positional relationship, two kinds of position and orientation are converted into positions and orientations in the same coordinate system to control movement of the vehicle. Both two kinds of position and orientation are not necessarily converted with respect to the coordinate system; the two kinds of position and orientation can be acquired as positional information based on the same coordinate system.

Hereinafter, the first embodiment of the disclosure will be described with reference to the accompanying drawings.

FIG. 1 illustrates a system configuration of the vehicle according to the present embodiment. A vehicle 10 according to the present embodiment includes an image sensor 12 and a distance sensor 13, which are sensors for estimating the position and orientation, an information processing apparatus 11, and a control device 14 for controlling movement of the vehicle 10. The image sensor 12 and the distance sensor 13 are fixed to the vehicle 10.

The position and orientation acquired in accordance with information inputted from the image sensor 12 and the distance sensor 13 of the present embodiment are specified by, for example, six parameters consisting of three parameters (X, Y, Z) representing the position of the sensor in a world coordinate system defined in the real space and three parameters (Roll, Pitch, Yaw) representing the orientation of the sensor.

Figure 2:
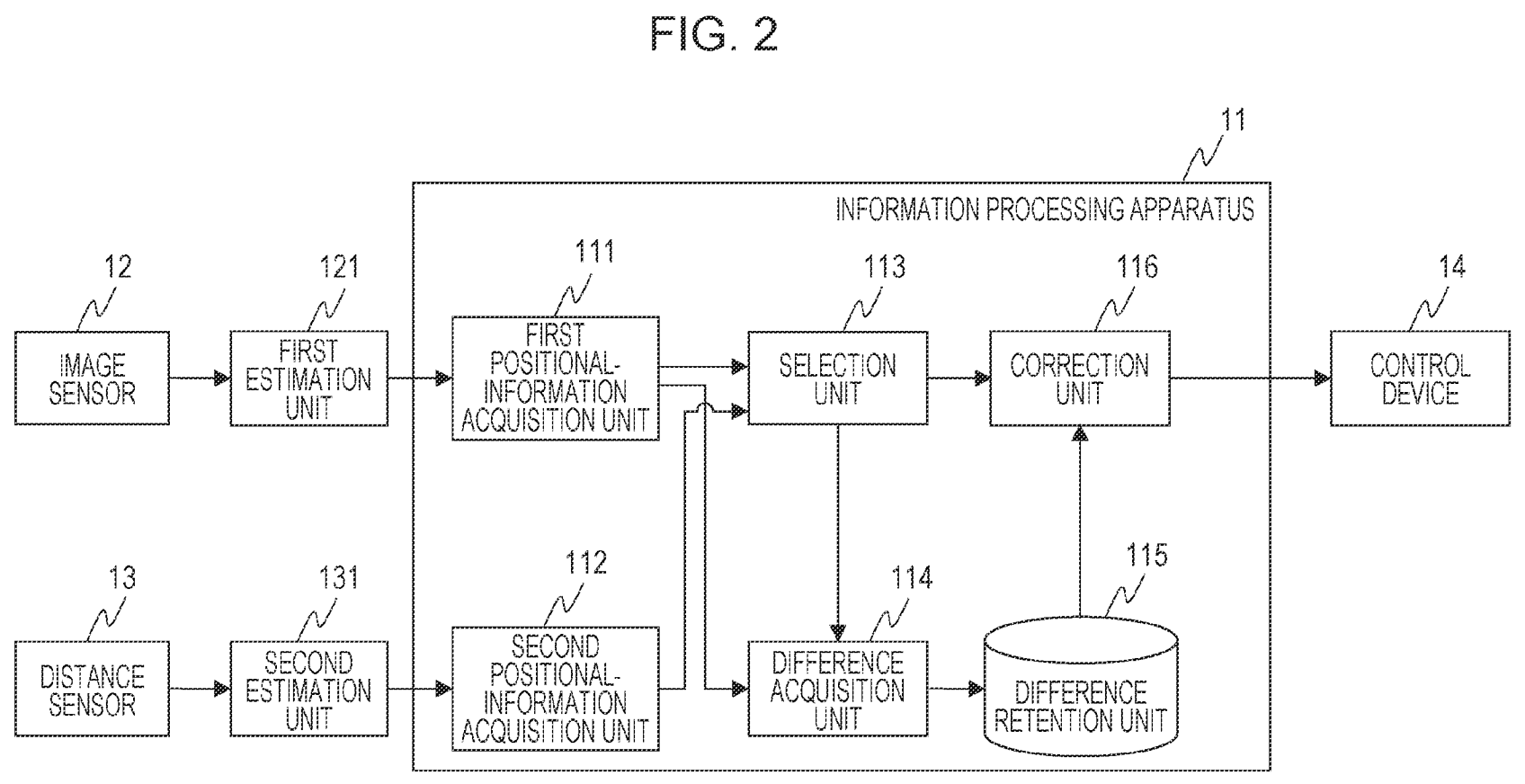

FIG. 2 illustrates a configuration example of the vehicle system including the information processing apparatus 11 according to the present embodiment.

The information processing apparatus 11 includes a first positional-information acquisition unit 111, a second positional-information acquisition unit 112, a selection unit 113, a difference acquisition unit 114, a difference retention unit 115, and a correction unit 116. The first positional-information acquisition unit 111 is coupled to a first estimation unit 121. The first estimation unit 121 is coupled to the image sensor 12. The second positional-information acquisition unit 112 is coupled to a second estimation unit 131. The second estimation unit 131 is coupled to the distance sensor 13. The correction unit 116 is coupled to the control device 14.

The first estimation unit 121 estimates positional information in accordance with input information acquired from the image sensor 12 and outputs an estimation result as the positional information to the first positional-information acquisition unit 111. The image sensor 12, which is, for example, a stereo camera, acquires image information as input information. The first estimation unit 121 stereoscopically measures feature points in the image and estimates three-dimensional positional information about the feature points. In the following description, the input information from the image sensor 12 before stereoscopic measurement is referred to as measurement information or measured value for convenience.

The second estimation unit 131 estimates positional information in accordance with input information acquired from the distance sensor 13 and outputs an estimation result as the positional information to the second positional-information acquisition unit 112. The distance sensor 13 measures the distance between an object in the environment and the distance sensor 13, and as a result, distance information can be acquired as input information. The distance sensor 13 is implemented by, for example, a LiDAR or time-of-flight (ToF) sensor. In the following description, the input information from the distance sensor 13 is referred to as measurement information or measured value for convenience.

The first positional-information acquisition unit 111 acquires positional information inputted by the first estimation unit 121 and outputs the positional information to the selection unit 113 and the difference acquisition unit 114.

The second positional-information acquisition unit 112 acquires positional information inputted by the second estimation unit 131 and outputs the positional information to the selection unit 113 and the difference acquisition unit 114.

The selection unit 113 selects either the positional information inputted by the first positional-information acquisition unit 111 or the positional information inputted by the second positional-information acquisition unit 112 and outputs a selection result and the selected positional information to the correction unit 116.

The difference acquisition unit 114 acquires the difference between the positional information inputted by the first positional-information acquisition unit 111 and the positional information inputted by the second positional-information acquisition unit 112 and outputs the difference as difference information to the difference retention unit 115. The positional information inputted by the first positional-information acquisition unit 111 and the positional information inputted by the second positional-information acquisition unit 112 are converted into positional information based on the same coordinate system.

The difference retention unit 115 retains the difference information inputted by the difference acquisition unit 114.

The correction unit 116 corrects the positional information inputted by the selection unit 113 in accordance with the difference information retained by the difference retention unit 115. The correction unit 116 outputs the corrected positional information to the control device 14.

The vehicle 10 may be equipped with the information processing apparatus 11. Alternatively, the information processing apparatus 11 implemented in the cloud may control the vehicle 10.

Figure 3:
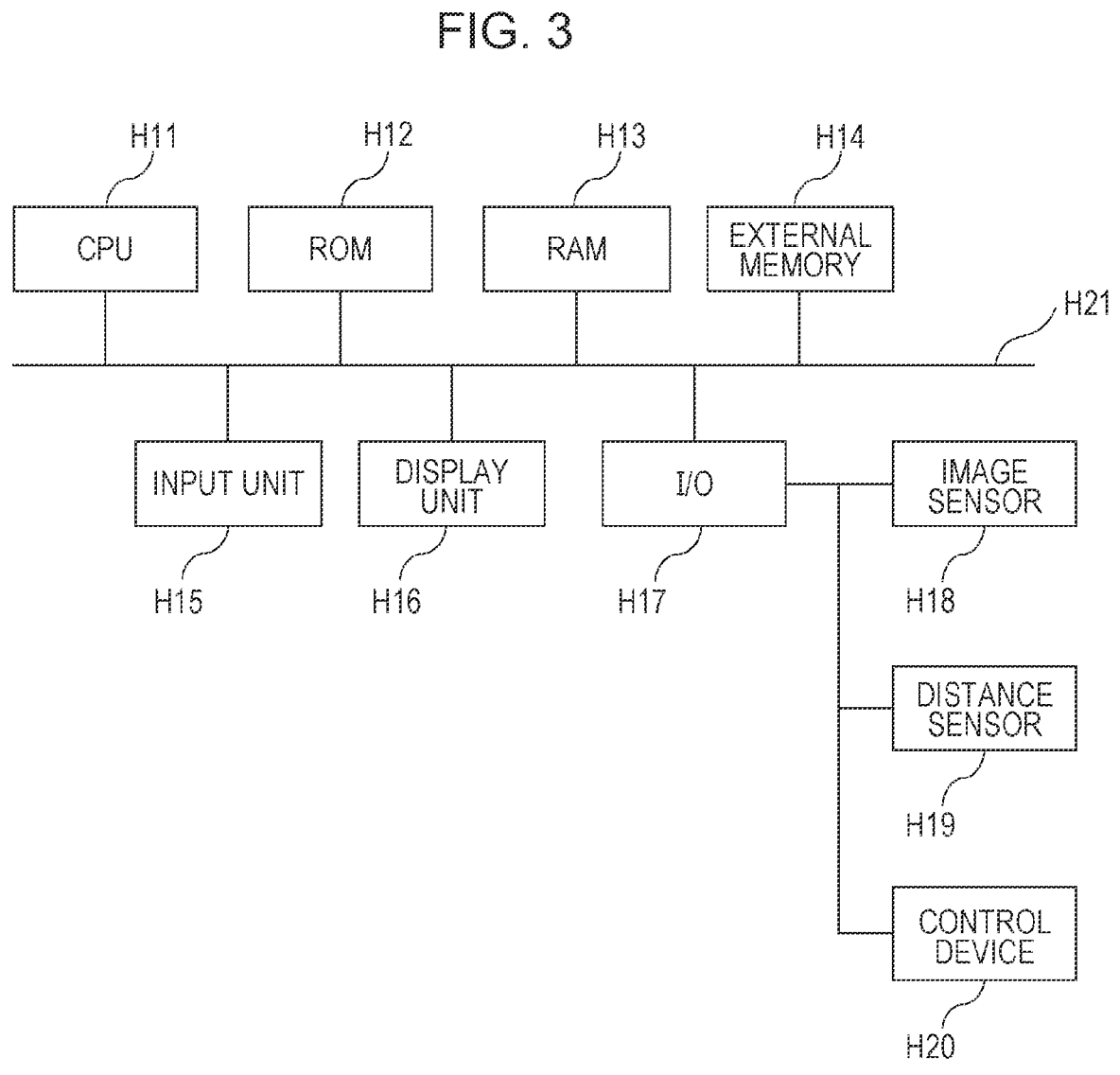

FIG. 3 illustrates a hardware configuration of the information processing apparatus 11. H11 indicates a central processing unit (CPU) that controls various components coupled to a system bus H21. H12 indicates a read-only memory (ROM) that stores a basic input/output system (BIOS) program and a boot program. H13 indicates a random-access memory (RAM) that is used as a primary storage device of the CPU H11. H14 indicates an external memory that stores a program to be run by the information processing apparatus 11. An input unit H15 is a keyboard and mouse, and a robot controller that perform processing operations regarding input of, for example, information. A display unit H16 outputs, in accordance with an instruction provided by the CPU H11, an operation result computed by the information processing apparatus 11 to a display device. The display device can be any type of display device including a liquid crystal display device, a projector, and a light-emitting diode (LED) indicator. H17 indicates a communication interface that communicates information through a network. The communication interface H17 may be configured for any kind of communication method including Ethernet, Universal Serial Bus (USB), serial communication, and wireless communication. H17 indicates an I/O for receiving image data from an image sensor H18 and distance data from a distance sensor H19. The image sensor H18 and the distance sensor H19 indicate the image sensor 12 and the distance sensor 13 described above. H20 indicates the control device 14 described above.

The CPU can function as various kinds of units by running a program. A control circuit such as an application-specific integrated circuit (ASIC) cooperating with the CPU may function as these various kinds of units. Alternatively, a control circuit of an image processing apparatus cooperating with the CPU may implement these various kinds of units. The information processing apparatus 11 does not necessarily include a single CPU and may include a plurality of CPUs. In this case, the plurality of CPUs can discretely perform processing operations. The plurality of CPUs may be installed in a single computer or a plurality of computers physically separated from each other. The units implemented by the CPU running the program may be implemented by circuits especially for the units.

Figure 4:
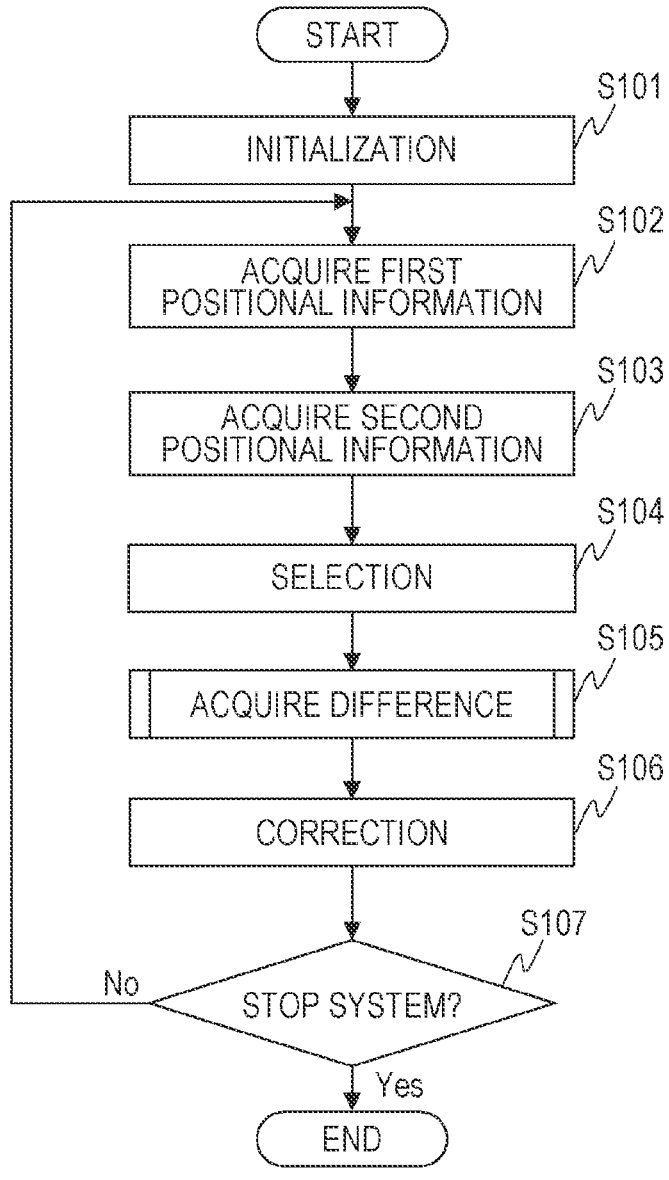
FIG. 4 is a flowchart illustrating a process implemented by the information processing apparatus.

FIG. 4 is a flowchart illustrating a processing procedure according to the present embodiment. When the AGV is instructed to start moving, the process of this flowchart starts. In the following description, the process of the flowchart is implemented by the CPU running a control program.

In step S101, the system is initialized. Specifically, a program is read from the external memory H14 to make the information processing apparatus 11 operable. Additionally, parameters regarding the devices coupled to the information processing apparatus 11 are written in the RAM H13. Additionally, the control device 14 of the vehicle is activated so that the control device 14 can operate and control the vehicle.

In step S102, the first positional-information acquisition unit 111 acquires the position and orientation estimated by the first estimation unit 121 in accordance with the input information acquired from the image sensor 12. In the present embodiment, to estimate the position and orientation by using the image sensor, a simultaneous localization and mapping (SLAM) technology, specifically, a method described in J. Engel, T. Schps, and D. Cremers. LSD-SLAM: Large-Scale Direct Monocular SLAM. In European Conference on Computer Vision (ECCV), 2014 is used. In this method, self positional estimation and mapping are carried out at the same time in a spacious environment such as the outdoor environment. When this technology is used, if the sensor acquires insufficient measured values, the technology may fail to estimate the position and orientation. Specifically, when the image acquired by the image sensor does not sufficiently include feature points (for example, intersections of edges and corners) of the image necessary for the estimation of position and orientation, the estimation of position and orientation fails. The estimation of position and orientation fails in, for example, the following cases: the acquired image is entirely black because the image is captured when the lens of the image sensor is blocked; the image entirely captures a white wall without any pattern. When the estimation of position and orientation fails, values of the position and orientation cannot be acquired. When the first positional-information acquisition unit 111 fails the estimation of position and orientation, the first positional-information acquisition unit 111 retrieves the positions and orientations acquired before the unsuccessful estimation. The first positional-information acquisition unit 111 then outputs to the selection unit 113 and the difference acquisition unit 114 all the positions and orientations acquired after the system is initialized. The first positional-information acquisition unit 111 may output to the selection unit 113 and the difference acquisition unit 114 the positions and orientations acquired for a particular period before the estimation of position and orientation fails. In this manner, the first positional-information acquisition unit 111 can output only the positions and orientations acquired for a period necessary for the difference acquisition unit 114 to acquire a difference and for the correction unit 116 to correct positional information, which reduces communication of information within the functional configuration.

The position and orientation can be outputted to the selection unit 113 and the difference acquisition unit 114 after the first positional-information acquisition unit 111 fails the estimation of position and orientation as described above. Alternatively, after the system is initialized, the position and orientation can be successively outputted to the selection unit 113 and the difference acquisition unit 114.

The positional information is array data in which a combination of the six parameters of position and orientation and time data is regarded as one element.

In step S103, the second positional-information acquisition unit 112 acquires the position and orientation estimated by the second estimation unit 131 in accordance with the measurement information acquired from the distance sensor 13. To estimate the position and orientation by using the distance sensor, a simultaneous localization and mapping (SLAM) technology using a three-dimensional (3D) laser scanner described in Ji Zhang, and Sanjiv Singh, "LOAM: Lidar Odometry and Mapping in Real-time", In Robotics: Science and Systems (RSS), 2014 is used. When the second positional-information acquisition unit 112 also fails the estimation of position and orientation, the second positional-information acquisition unit 112 retrieves the positions and orientations acquired before the unsuccessful estimation. The second positional-information acquisition unit 112 then outputs to the selection unit 113 and the difference acquisition unit 114 all the positions and orientations acquired after the system is initialized. The second positional-information acquisition unit 112 may output to the selection unit 113 and the difference acquisition unit 114 the positions and orientations acquired for a particular period before the estimation of position and orientation fails.

The position and orientation can be outputted to the selection unit 113 and the difference acquisition unit 114 after the second positional-information acquisition unit 112 fails the estimation of position and orientation as described above. Alternatively, after the system is initialized, the position and orientation can be successively outputted to the selection unit 113 and the difference acquisition unit 114.

In the present embodiment, the image sensor 12 and the distance sensor 13 simultaneously operate, and thus, the position and orientation are estimated by using values measured at the same time as input.

In step S104, the selection unit 113 selects the positional information inputted by the first positional-information acquisition unit 111 or the positional information inputted by the second positional-information acquisition unit 112. In the present embodiment, the positional information inputted by the first positional-information acquisition unit 111 is usually selected with priority. When the positional information of the first positional-information acquisition unit 111 does not include the position and orientation at the present time, that is, when the estimation of position and orientation according to values measured by the image sensor 12 fails, the positional information inputted by the second positional-information acquisition unit 112 is selected. The selection result and selected positional information are outputted to the difference acquisition unit 114 and the correction unit 116.

In step S105, the difference acquisition unit 114 calculates the difference between the two kinds of positional information inputted by the first positional-information acquisition unit 111 and the second positional-information acquisition unit 112 and outputs the difference as difference information to the difference retention unit 115. The processing operation in step S105 is independent of the processing operation in step S104; the processing operation in step S105 can start when the processing operation in step S102 and the processing operation in step S103 are completed. The difference information is represented by the six parameters of position and orientation. How to calculate the difference will be described in detail later. The two kinds of positional information are two kinds of positional information converted in accordance with the same coordinate system.

In step S106, the correction unit 116 corrects the positional information inputted by the selection unit 113 in accordance with the difference information retained by the difference retention unit 115. How to correct the positional information will be described in detail later. The corrected positional information is outputted to the control device 14 to control movement of the uncrewed vehicle.

In step S107, it is determined whether to stop the system (stop the vehicle). Specifically, when the input unit H15 receives from a user an instruction for stopping the system, the system is stopped. Otherwise, the process returns to step S102 and continues.

Figure 5:
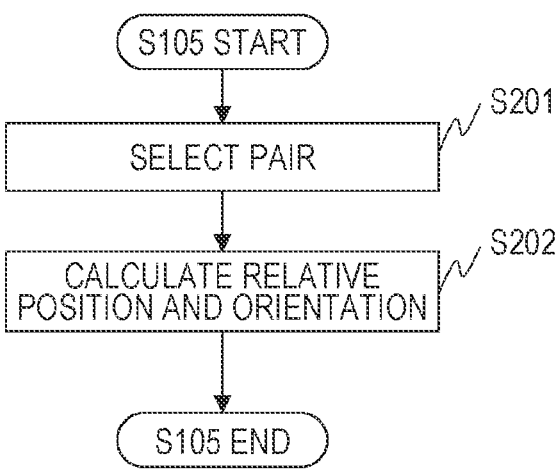
FIG. 5 is a flowchart illustrating a process implemented by a difference acquisition unit.

FIG. 5 is a flowchart illustrating a processing procedure of how to acquire the difference in step S105.

In step S201, a combination of position and orientation to be used as input to acquire a difference is selected from the positional information inputted by the first positional-information acquisition unit 111 and the second positional-information acquisition unit 112. In the present embodiment, when the position and orientation acquired at a most recent time by the first positional-information acquisition unit 111 and the position and orientation acquired at the most recent time by the second positional-information acquisition unit 112 both exist, the position and orientation acquired by the first positional-information acquisition unit 111 and the position and orientation acquired by the second positional-information acquisition unit 112 are selected as a combination.

In step S202, a relative position and a relative orientation are acquired in accordance with the two kinds of position and orientation selected in step S201. Specifically, the six parameters of position and orientation acquired by the first positional-information acquisition unit 111 and the second positional-information acquisition unit 112 are divided into translational components (X, Y, Z) and rotational components (Roll, Pitch, Yaw). By using these components, a relative position and a relative orientation are respectively acquired. The relative position is acquired by subtracting the translational components of position and orientation acquired by the second positional-information acquisition unit 112 from the translational components of position and orientation acquired by the first positional-information acquisition unit 111 with respect to each kind of parameter. The relative orientation is acquired by converting the rotational components into a 3×3 rotation matrix. A transformation matrix M is given by RV=MRL, where RV is a rotation matrix acquired by converting the position and orientation acquired by the first positional-information acquisition unit 111, and RL is a rotation matrix acquired by converting the position and orientation acquired by the second positional-information acquisition unit 112. The transformation matrix M represents the relative orientation. The acquired relative position and relative orientation are outputted as difference information to the difference retention unit 115. The difference retained by the difference retention unit 115 is, for example, a difference due to an error in measurement by the image sensor 12 and the distance sensor 13. In reality, when the selection unit 113 switches from the first positional-information acquisition unit 111 to the second positional-information acquisition unit 112, the position and orientation of the vehicle does not change.

The processing procedure of acquiring a difference is used when the estimation of position and orientation according to values measured by the image sensor 12 fails, in other words, when the selection unit 113 switches from the first positional-information acquisition unit 111 to the second positional-information acquisition unit 112. Conversely, when the estimation of position and orientation using the image sensor 12 succeeds again, in other words, when the selection unit 113 switches from the second positional-information acquisition unit 112 to the first positional-information acquisition unit 111, the difference information is reset to initial values because the correction operation is unnecessary. The initial values of X, Y, and Z of relative position are 0. The initial values of a rotation matrix of relative orientation are indicated as an identity matrix.

The following is a description of a processing procedure of how to correct positional information in step S106.

The position and orientation are corrected by adding the relative position and relative orientation retained by the difference retention unit 115 to the position and orientation inputted by the selection unit 113 to the correction unit 116. Specifically, in the correction operation, the translational components and the rotational components are divided in the same manner as the difference acquisition operation, and calculation is carried out for each kind of component. The translational components are acquired by adding the relative position included in difference information to the translational components of position and orientation inputted by the selection unit 113 with respect to each parameter. The rotational components are acquired by converting the rotational components of position and orientation inputted by the selection unit 113 into a 3×3 rotation matrix RS and calculating a matrix product MRS with the relative orientation included in difference information. The position and orientation corrected as described above are outputted as positional information to the control device 14.

The description above describes the case in which, in the system using the position and orientation estimated in accordance with two kinds of sensor values to control movement of the vehicle, the position and orientation used for control is switched from the position and orientation estimated in accordance with the information inputted from the image sensor to the position and orientation estimated in accordance with the information inputted from the distance sensor. The difference between the position and orientation estimated by using the image sensor (first sensor) and the position and orientation estimated by using the distance sensor (second sensor) is acquired, and the position and orientation after switching is corrected in accordance with the difference. The position and orientation expected to be estimated by using the image sensor before switching is calculated by using the position and orientation estimated by using the distance sensor after switching and the difference. This can hinder unstable movement of the vehicle when the position and orientation estimated by using either sensor differ between before and after switching. The position and orientation of the vehicle is corrected in S106 to be closer to, that is, to reduce the difference from the position and orientation estimated by using the sensor before switching, and as a result, the continuity can be easily maintained. It should be noted that the information processing apparatus 11 according to the present embodiment can control not only movement of an AGV but also flight of an uncrewed aerial vehicle equipped with an image sensor and a distance sensor such as a drone.

In the case in which the estimation of position and orientation by using the image sensor (first sensor) succeeds again after the estimation has failed, when the estimation of position and orientation is switched back to the estimation according to values measured by the image sensor, it is possible to correct the position and orientation. The following is a description of how to determine a period in which switching from the estimation of position and orientation according to values measured by the distance sensor to the estimation of position and orientation according to values measured by the image sensor is completed and integrate the position and orientation estimated by using the distance sensor and the position and orientation estimated by using the image sensor by weighted averaging to gradually perform switching during the period.

In addition to the functional configuration of the information processing apparatus 11 illustrated in FIG. 2, a period determination unit, a weight determination unit, and an integration unit are included.

The period determination unit determines a period in which switching from the second positional-information acquisition unit 112 to the first positional-information acquisition unit 111 is completed and outputs the period as period information to the weight determination unit.

The weight determination unit determines a weight by using the period information inputted by the period determination unit and outputs the weight to the integration unit.

The integration unit integrates, in accordance with the weight inputted by the weight determination unit, two kinds of positional information acquired by the first positional-information acquisition unit 111 and the correction unit 116.

Figure 6:
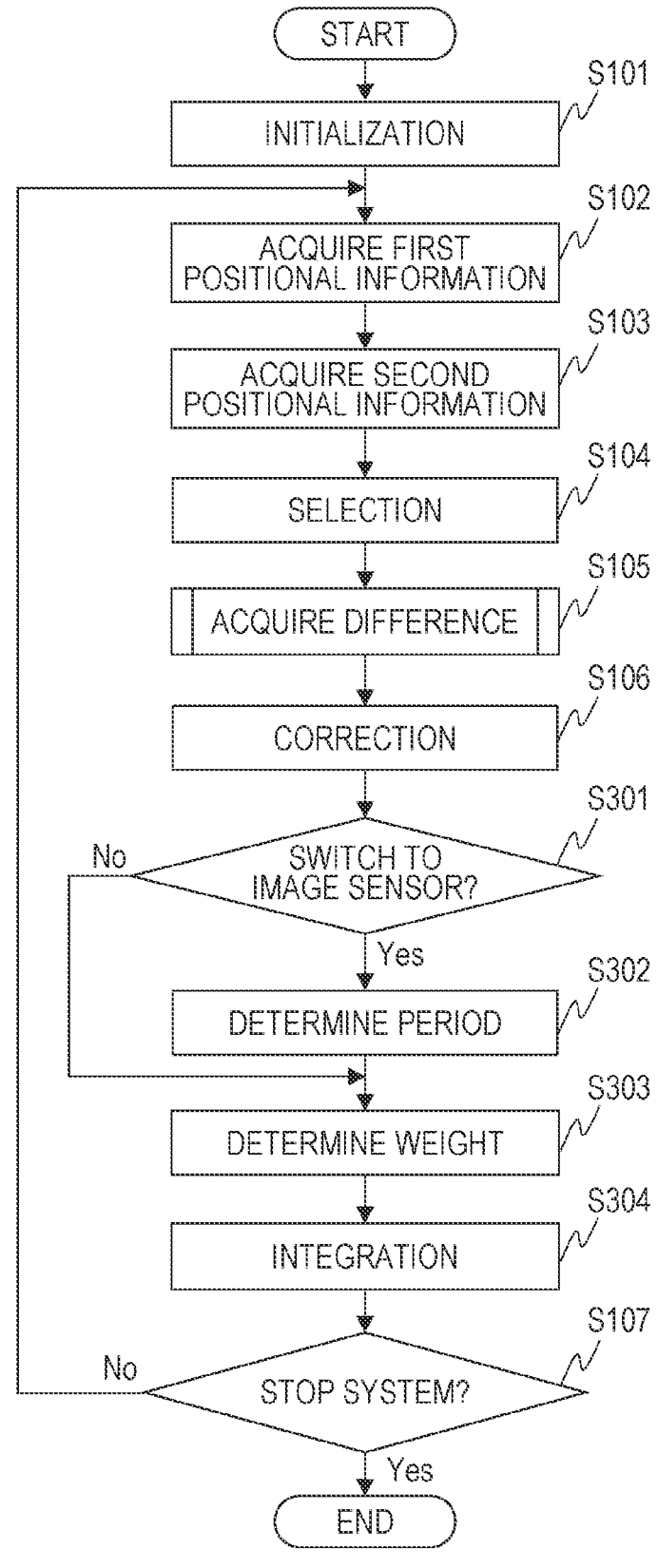
FIG. 6 is a flowchart illustrating a process implemented by the information processing apparatus.

FIG. 6 is a flowchart illustrating a processing procedure according to the present embodiment. Descriptions of the steps identical to the steps in FIG. 4 are not repeated, and only different steps of the processing procedure will be described.

In step S301, when the selection result stored in the RAM H13 indicates the second positional-information acquisition unit 112 and the selection result inputted by the selection unit 113 indicates the first positional-information acquisition unit 111, the process proceeds to step S302; in other words, when the sensor used as input for the estimation of position and orientation is switched from the distance sensor 13 to the image sensor 12, the process proceeds to step S302. Otherwise, the process skips to step S303.

In step S302, the period determination unit determines a period in which switching from the estimation of position and orientation according to values measured by the distance sensor (second sensor) to the estimation of position and orientation according to values measured by the image sensor (first sensor) is completed. In the present embodiment, this period is assumed to be ten iterations (one output of position and orientation per iteration).

In step S303, the weight determination unit determines, in accordance with the period information inputted by the period determination unit, a weight for the position and orientation estimated in accordance with values measured by the image sensor 12 and a weight for the position and orientation estimated in accordance with values measured by the distance sensor 13. The weight for the position and orientation according to the image sensor is to gradually increase for ten iterations from start of the period, at which the weight is 0, to end of the period; thus, when a weight for the position and orientation according to the image sensor is WC ($0 \leq WC \leq 1$), WC=(the current number of iterations)/10. When a weight for the position and orientation according to the distance sensor is WL ($0 \leq WL \leq 1$), WL=1−WC. This is because the weight for the position and orientation according to the distance sensor is to be balanced against the weight for the position and orientation according to the image sensor. The weight determination unit stores the current number of iterations in the RAM H13 and adds 1 to the current number of iterations every time the processing operation in step S303 is performed, so that the weight for the image sensor gradually increases with respect to the distance sensor. For example, when the period starts, the weight for the position and orientation estimated in accordance with values measured by the distance sensor 13 is 1; when the period ends, the weight for the position and orientation estimated in accordance with values measured by the image sensor is 1.

In step S304, the integration unit integrates, in accordance with the weight inputted by the weight determination unit, the position and orientation estimated in accordance with values measured by the image sensor 12 and the position and orientation estimated in accordance with values measured by the distance sensor 13 by weighted averaging. Specifically, the position and orientation after integration are acquired by calculating the weighted average with respect to each of the six parameters of position and orientation.

As described above, when the sensor used for estimation is switched to the other sensor and the other sensor is later switched back to the previous sensor, a period until switching is completed is determined, and two kinds of position and orientation are integrated by weighted averaging such that the other sensor can be gradually switched back to the previous sensor. This can hinder unstable movement of the vehicle when the position and orientation differ at the time of switching.

Modification 1-1

In the first embodiment, the first positional-information acquisition unit 111 acquires the position and orientation estimated by using a SLAM technology with the image sensor 12. The second positional-information acquisition unit 112 acquires the position and orientation estimated by using the SLAM technology with the distance sensor 13. However, these examples should not be construed in a limiting sense, and any sensor can be used with the SLAM technology. An active distance sensor using a method such as Time of Flight or light pattern projection may be used with the SLAM technology to estimate the position and orientation.

The estimation method is not limited to the SLAM technology. The technical idea of the present embodiment can be applied to any method for estimating the position and orientation. One example is a method based on measurement of intensity of radio waves for wireless communication such as Wi-Fi. Another example is a method employing time difference in sensing with the use of a tracking sensor for satellite navigation using the Global Positioning System (GPS) or magnetic tracking sensor, or many optical sensors. Still another example is a method of model fitting based on computer-aided design (CAD) data by using an image captured by a camera installed at a given location such as a monitoring camera. Other examples include a method of estimating the position and orientation in accordance with the acceleration rate and angular velocity acquired by an inertial measurement unit (IMU) and a method of estimating the position and orientation by odometry using the rotation angles of tires.

Modification 1-2

In the first embodiment, the positional information acquired by the first positional-information acquisition unit 111 and the positional information acquired by the second positional-information acquisition unit 112 include the six parameters of position and orientation. However, this should not be construed in a limiting sense. When the positional information includes information indicating the position and orientation, the technical idea of the present embodiment can be applied. For example, the positional information may include three parameters composed of two parameters of position (positions X and Y in a horizontal plane with respect to a floor in the real space) and one parameter of orientation (rotation direction in the horizontal plane with respect to the floor in the real space) that together represent the two-dimensional position and orientation. Alternatively, the positional information may include only parameters of position without including parameters of orientation.

Modification 1-3

In the first embodiment, one combination of position and orientation is selected for the difference acquisition unit 114 to acquire the difference. However, this should not be construed in a limiting sense, and a plurality of combinations may be selected as input for acquiring the difference. To calculate the difference when a plurality of combinations of position and orientation are used as input, a method for acquiring a relative positional relationship is used. Examples of the difference calculation method include, for example, a method of minimizing variations in relative position and orientation based on two kinds of position and orientation by using the least-squares method and a method of acquiring an average value of each kind of the parameters of position and orientation.

In the first embodiment, the image sensor 12 and the distance sensor 13 simultaneously operate, and values measured at the same time are used as input to estimate the position and orientation. However, this should not be construed in a limiting sense, and the position and orientation may be estimated at different timings without the image sensor 12 and the distance sensor 13 operating simultaneously. In this case, the following modifications are used to select a combination of position and orientation targeted by the difference acquisition unit 114 to calculate a difference. For example, one set of position and orientation estimated in accordance with values measured by the distance sensor 13 at a time closest to the time of the position and orientation estimated in accordance with values measured by the image sensor 12 are selected. In some cases, no set of position and orientation may be estimated in accordance with values measured by the distance sensor 13 at a time closer to the time of the position and orientation estimated in accordance with values measured by the image sensor 12 and targeted for difference acquisition. In these cases, in accordance with the position and orientation estimated by using the distance sensor 13 at another time, the position and orientation at a desired time may be acquired by interpolation or assumption.

In the first embodiment, the difference acquisition unit 114 calculates a difference only when the first positional-information acquisition unit 111 is switched to the second positional-information acquisition unit 112. However, this should not be construed in a limiting sense, and a difference may be calculated at any timing. For example, after switching to the second positional-information acquisition unit 112, the vehicle may move a long distance until the estimation of position and orientation using the image sensor 12 succeeds again. In this case, the difference in the acquired position and orientation between the first positional-information acquisition unit 111 and the second positional-information acquisition unit 112 may be larger or smaller than the difference calculated when switching is performed. For this reason, the difference may be calculated again, and the difference information may be updated. The difference information may be updated at regular distances or regular intervals; a parameter of the distance or interval may be determined by a user inputting the parameter with the input unit H15.

Modification 1-4

In the first embodiment, the vehicle system 10 is not limited to an uncrewed vehicle (vehicle). The vehicle system 10 may be, for example, an automated driving vehicle, autonomous mobile robot, or uncrewed aerial vehicle.

Modification 1-5

In the first embodiment, the vehicle system 10 uses the position and orientation to control movement of the vehicle. However, this should not be construed in a limiting sense, and the vehicle system 10 can use the position and orientation for purposes other than control of movement of the vehicle. For example, the vehicle system 10 may be applied to technologies such as mixed reality (MR), virtual reality (VR), and augmented reality (AR) for the purpose of estimating the position and orientation of user's viewpoint.

Modification 1-6

The information processing apparatus 11 may include an indicator unit, which is not illustrated in the drawings. For example, in the case in which three colors of lights including red, yellow, and green are used as the indicator unit, while the selection unit 113 selects the first positional-information acquisition unit 111, the green light is turned on; while the selection unit 113 selects the second positional-information acquisition unit 112, the yellow light is turned on; while the first positional-information acquisition unit 111 is switched to the second positional-information acquisition unit 112, the red light is turned on. As such, the selection result can be visualized for the user. The indicator unit can be implemented as any device such as an LED lamp or liquid crystal display when the device can indicate information about the selection result of position and orientation for the user. The indicator unit may be a speaker that sounds a predetermined alarm or melody in accordance with the selection result of position and orientation. The indicator unit may indicate information other than the selection result of position and orientation; the indicator unit may indicate, for example, the difference information retained by the difference retention unit 115.

Modification 1-7

In the embodiment described above, when the estimation of position and orientation based on values measured by the image sensor fails and the sensor used for estimation is switched to the distance sensor, the difference in position and orientation between the two sensors is acquired, and correction is performed by using the difference. Additionally, when the sensor used for estimation is switched back to the image sensor (first sensor), two kinds of position and orientation are integrated, and as a result, the difference in position and orientation at the time of switching is reduced. However, the disclosure can be applied to the case in which the estimation of position and orientation succeeds by using both two kinds of sensors. The following is a description of how to automatically select a sensor used as input in accordance with priority levels given to two sensors in association with the position and orientation when the two sensors both succeed in the estimation of position and orientation.

Only processing operations different from the process described by using FIG. 4 will be described, and descriptions of the other processing operations are not repeated because the other processing operations are the same as the process in FIG. 4.

In step S102, the first positional-information acquisition unit 111 and the second positional-information acquisition unit 112 acquire, in addition to positional information, a reliability level of the positional information. The reliability level is an index indicating the accuracy of the estimation result of position and orientation. The reliability level is calculated such that, as the number of feature points used to estimate the position and orientation increases, the reliability level increases. The acquired reliability level is outputted as a priority level to the selection unit 113.

In step S103, the positional information is acquired from the first positional-information acquisition unit 111 and the second positional-information acquisition unit 112, and the positional information associated with a higher priority level is selected.

When the two kinds of sensors both succeed in the estimation of position and orientation, the positional information acquired by the first positional-information acquisition unit 111 and the positional information acquired by the second positional-information acquisition unit 112 are automatically switched in accordance with the priority level associated with the position and orientation. The difference between two kinds of position and orientation is calculated at the time of switching, and the position and orientation after switching is corrected in accordance with the difference. This can hinder unstable movement of the vehicle when the position and orientation differ at the time of switching, while selecting the position and orientation with a higher reliability level.

Modification 1-8

In the modification 1-7, the priority level is a reliability level indicating the accuracy of the estimation result of position and orientation. However, this should not be construed in a limiting sense, and any kind of priority level can be used when the priority level is related to positional information. For example, the number of feature points detected when the position and orientation is estimated in accordance with the input by the image sensor may be used as the priority level. Alternatively, the priority level may be determined by processing operations other than estimating the position and orientation. For example, when an image entirely has the same level of luminance, it is expected that the position and orientation may fail, and thus, a low priority level is set. When the average of luminance of an image is extremely low (or high), a low priority level is set for the image sensor, whereas a high priority level is set for the distance sensor. When the distance to an entire group of points acquired by the distance sensor is equal to or greater than a threshold, it is expected that the accuracy of estimation of position and orientation may be low, and thus, a low priority level is set. The priority level may be determined directly on the basis of values measured by the sensor. The priority level may be determined directly on the basis of an index other than values measured by the sensor. For example, when the vehicle retains map information about part of the route along which the vehicle moves, and the map information is used as input data for estimating the position and orientation, whether the map information about the current position of the vehicle exists may be used to determine the priority level. When a map for the image sensor exists, a high priority level is set to the position and orientation estimated by using the image sensor. When a map for the distance sensor exists, a high priority level is set to the position and orientation estimated by using the distance sensor.

Second Embodiment

In the first embodiment, while one sensor fails to estimate the position and orientation, when the one sensor is switched to the other sensor, the difference in position and orientation between the two sensors is calculated, and correction is performed by using the difference. A second embodiment describes a method of assisting the estimation of position and orientation by providing one sensor failing the estimation of position and orientation with the position and orientation according to the other sensor.

The functional configuration of the present embodiment differs from the functional configuration of the information processing apparatus 11 according to the first embodiment described with reference to FIG. 2 in that the first estimation unit 121 and the second estimation unit 131 are coupled to each other.

Figure 7:
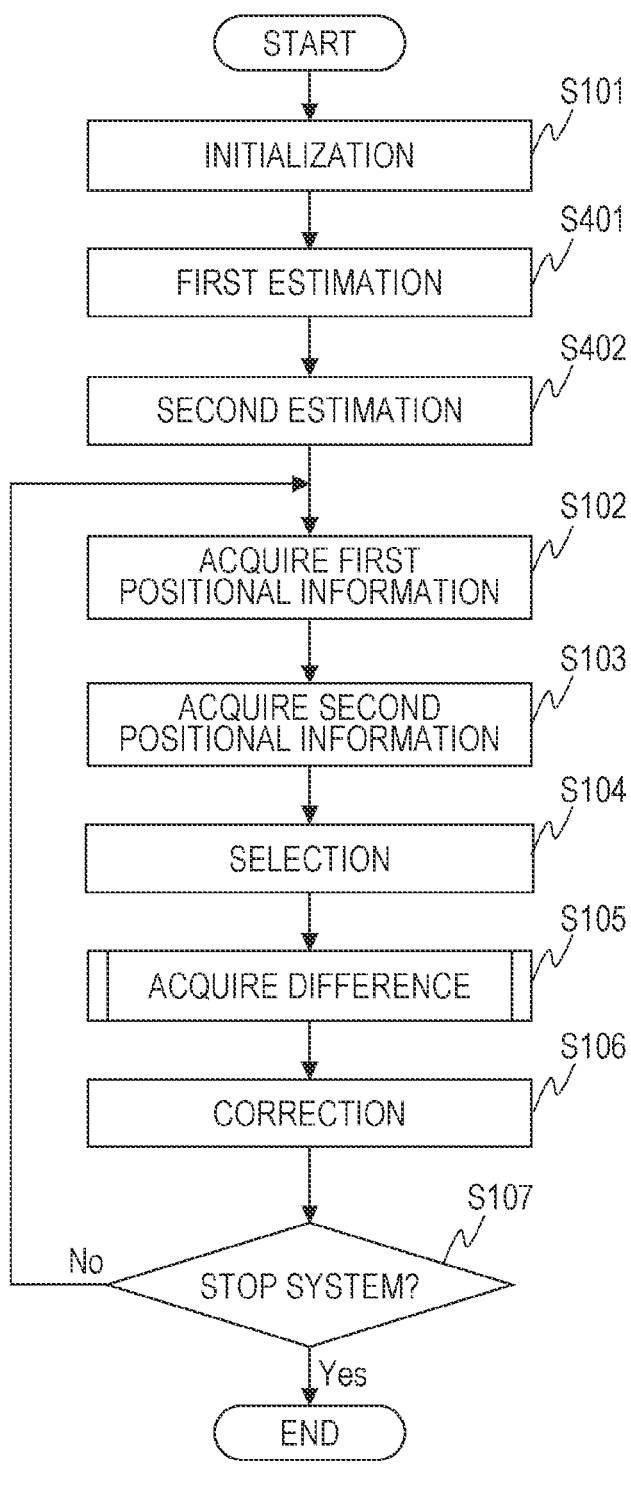
FIG. 7 is a flowchart illustrating a process implemented by the information processing apparatus.

FIG. 7 is a flowchart illustrating a processing procedure according to the present embodiment. Descriptions of the same steps as in FIG. 4 for explaining the processing procedure of the information processing apparatus 11 described in the first embodiment are not repeated, and only steps of the processing procedure different from the first embodiment will be described.

In step S401, the first estimation unit 121 estimates the position and orientation in accordance with values measured by the image sensor 12 and outputs the position and orientation to the first positional-information acquisition unit 111 and the second estimation unit 131. To estimate the position and orientation, an estimation result of position and orientation acquired at the previous time is used as initial values. When the first estimation unit 121 has failed the estimation of position and orientation at the previous time, the position and orientation inputted by the second estimation unit 131 are used as initial values to estimate the position and orientation.

In step S402, the second estimation unit 131 estimates the position and orientation in accordance with values measured by the distance sensor 13 and outputs the position and orientation to the second positional-information acquisition unit 112 and the first estimation unit 121. In the same manner as the first estimation unit 121, to estimate the position and orientation, an estimation result of position and orientation acquired at the previous time is used as initial values. When the second estimation unit 131 has failed the estimation of position and orientation at the previous time, the position and orientation inputted by the first estimation unit 121 are used as initial values to estimate the position and orientation.

According to the second embodiment, in the system using two kinds of position and orientation estimated in accordance with values measured by two kinds of sensors to control movement of the vehicle, when the estimation of position and orientation based on values measured by the image sensor fails, the position and orientation used for control is switched from the position and orientation estimated by using the image sensor to the position and orientation estimated by using the distance sensor to be used. When switching is performed, the difference in position and orientation between the two kinds of sensor values is acquired, and the position and orientation based on the second sensor values are corrected in accordance with the difference. This can hinder unstable movement of the vehicle when the position and orientation differ after switching. While the estimation of position and orientation based on values measured by the image sensor (first sensor) fails, the position and orientation based on values measured by the distance sensor (second sensor) are inputted as parameters for estimation to assist the estimation of position and orientation based on values measured by the image sensor (first sensor). As a result, two kinds of positional information based on two kinds of sensor values can be more efficiently used to estimate the position and orientation.

Third Embodiment

The first and second embodiments describe the correction method used when two kinds of sensors are switched to estimate the position and orientation in the case in which two kinds of position and orientation are estimated in accordance with two kinds of input information from the two kinds of sensors. The present embodiment describes the case in which one set of position and orientation are estimated in accordance with information outputted by a plurality of sensors for the purpose of improving the precision of estimation of position and orientation. Here, the plurality of sensors include an image sensor and an IMU.

It is assumed that the present embodiment is applied to a system in which the position and orientation estimated in accordance with information outputted by the image sensor and the IMU are used to control movement of the vehicle. When the estimation of position and orientation based on information outputted by the image sensor and the IMU fails, the position and orientation used for control is switched from the position and orientation estimated by using the image sensor and the IMU to the position and orientation estimated by using only the IMU. When switching is performed, the difference between two kinds of position and orientation is acquired, and the position and orientation based on the second sensor values are corrected in accordance with the difference. The two kinds of position and orientation are the position and orientation estimated by using both the image sensor and the IMU and the position and orientation estimated by using the IMU.

The functional configuration according to the present embodiment differs from the functional configuration of the information processing apparatus 11 according to the first embodiment described with reference to FIG. 2 in that the distance sensor 13 is replaced with the IMU coupled to the first estimation unit 121 and the second estimation unit 131.

The flowchart of the processing procedure according to the present embodiment is not illustrated in the drawings because the flowchart according to the present embodiment is identical to the flowchart according to the first embodiment in FIG. 4. Here, descriptions of the same steps as in the first embodiment are not repeated, and only steps of the processing procedure different from the first embodiment will be described.

In step S102, the first positional-information acquisition unit 111 acquires the position and orientation estimated by the first estimation unit 121 in accordance with the input information acquired from the image sensor 12 and the IMU. In the present embodiment, to estimate the position and orientation by using the image sensor and the IMU, a method of ORB-SLAMS described in Carlos Campos et. al, ORB-SLAMS: An Accurate Open-Source Library for Visual, Visual-Inertial and Multi-Map SLAM. Cornell University is used. In this method, it is determined whether any of a plurality of image features stored as a map for measuring the position and orientation match image features detected in image data captured by a camera. The position and orientation are measured by minimizing the total (residual error) of differences in position and orientation calculated by using combinations of positions of image features and inertial data. In the present embodiment, the map for measuring the position and orientation is created by the first estimation unit 121 before the vehicle 10 starts self-driving and retained by the first estimation unit 121. When this technology is employed, similarly to the SLAM technology described in the first embodiment, the estimation of position and orientation may fail in accordance with values measured by the sensors. When the estimation of position and orientation fails, the first positional-information acquisition unit 111 retrieves all sets of position and orientation after the system is initialized and before the unsuccessful estimation and outputs the sets of position and orientation to the selection unit 113 and the difference acquisition unit 114.

In step S103, the second positional-information acquisition unit 112 acquires the position and orientation estimated by the second estimation unit 131 in accordance with information inputted by the IMU. In the present embodiment, to estimate the position and orientation by using the IMU, a method is used in which the amount of change in position is calculated by integrating twice each of the acceleration rate and the angular velocity with unit time by using the position immediately after the IMU is activated as a standard point in the coordinate system of the IMU.

When one set of position and orientation is estimated in accordance with information outputted by a plurality of sensors for the purpose of improving the precision of estimation of position and orientation, the method according to the present embodiment can hinder unstable movement of the vehicle when the position and orientation differ after switching. The position and orientation expected to be estimated by using the image sensor and the IMU before switching is calculated by using the position and orientation estimated by using the IMU after switching and the difference. The position and orientation of the vehicle is corrected in S106 to be closer to the position and orientation estimated by using the image sensor and the IMU before switching, and as a result, the continuity can be easily maintained.

Modification 3-1

In the third embodiment, the first positional-information acquisition unit 111 acquires the position and orientation estimated by using the SLAM technology with the image sensor 12 and the IMU. However, the combination of sensors used to acquire positional information is not limited to this example. Any combination can be used when the combination can be used to estimate the position and orientation.

For example, the position and orientation may be estimated by combining the SLAM technology using the image sensor with odometry for estimating the position and orientation in accordance with the rotation angle of tires and the rotation angle of steering. Alternatively, the position and orientation may be estimated by combining the SLAM technology using the image sensor and the IMU with odometry. Alternatively, the position and orientation may be estimated by combining the SLAM technology using the image sensor with satellite navigation information acquired by using the GPS.

The second positional-information acquisition unit 112 acquires the position and orientation in accordance with information inputted by the IMU. The sensor used for the second positional-information acquisition unit is not limited to the IMU. Any sensor can be used when the sensor outputs information usable to estimate the position and orientation. For example, control information of the image sensor and vehicle or sensor values according to the GPS may be used as input information for estimating the position and orientation.

The first positional-information acquisition unit and the second positional-information acquisition unit may be used with any combination. For example, the first positional-information acquisition unit may use an image sensor and a GPS device, whereas the second positional-information acquisition unit may use an image sensor and an IMU.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-184617, filed Nov. 4, 2020 and No. 2021-135585 filed Aug. 23, 2021, which are hereby incorporated by reference herein in their entirety.

What is claimed is:

1. An apparatus comprising:

at least one processor; and a memory coupled to the at least one processor, the memory having instructions that, when executed by the processor, causes the at least one processor to function as:

a first acquisition unit configured to acquire a first position information about a vehicle, the first position information being estimated in accordance with input information from a first sensor fixed to the vehicle;

a second acquisition unit configured to acquire a second position information about the vehicle, the second position information being estimated in accordance with input information from a second sensor fixed to the vehicle, the second sensor being less reliable than the first sensor;

a selection unit configured to select a position information for controlling movement of the vehicle from the first position information and the second position information according to a same coordinate system;

a difference acquisition unit configured to acquire difference information between the first position information and the second position information acquired simultaneously with the first position information, the difference information being according to the same coordinate system; and an update unit configured to, when the position information selected by the selection unit is switched from the first position information to the second position information, the difference information acquired at the time of switching is continuously used as an offset to update the second position information until the first position information is re-selected, wherein the first position information expected to be estimated by using the first sensor before switching is calculated by using the second position information estimated by using the second sensor after the switching and the difference information, an integration unit configured to integrate the first position information and the updated second position information by weighted averaging when the position information selected by the selection unit is switched from the second position information to the first position information, wherein the weighted averaging is performed so that the weight assigned to the first position information gradually increases over time.

2. The apparatus according to claim 1, wherein the difference acquisition unit is configured to select, in accordance with the first position information and the second position information that are acquired before the selected position information is switched to the other position information, a combination of position information targeted for difference acquisition and also configured to acquire the difference information in accordance with the selected combination of position information.

3. The apparatus according to claim 1, wherein the selection unit is configured to select the first position information with priority, and when the first acquisition unit fails to acquire the first position information, select the acquired second position information.

4. The apparatus according to claim 3, wherein the at least processor further functions as:

a period determination unit configured to, when the selection unit switches from the second position information to the first position information, determine a period in which the selection unit switches from the second position information to the first position information;

a weight determination unit configured to determine a weight for the first position information and the second position information such that, when the determined period starts, priority is given to the second position information, and when the period ends, priority is given to the first position information; and an integration unit configured to integrate the first position information and the second position information corrected by the correction unit by averaging the first position information and the second position information by weighted averaging using the determined weight.

5. The apparatus according to claim 1, wherein the selection unit is configured to select the first position information or the second position information in accordance with a priority level given to the first position information and a priority level given to the second position information.

6. The apparatus according to claim 1, wherein the selection unit is configured to output information indicating a selection result acquired by the selection unit to a display device.

7. The apparatus according to claim 1, wherein the first sensor is a sensor configured to input image information as the input information.

8. The apparatus according to claim 1, wherein the second sensor is a distance sensor configured to measure as the input information a distance between the second sensor and an object in an environment.

9. The apparatus according to claim 1, wherein the difference acquisition unit is configured to acquire the difference information at predetermined intervals, and the correction unit is configured to correct the other position information selected by the selection unit by using the difference information most recently acquired by the difference acquisition unit.

10. An apparatus comprising:

at least one processor; and a memory coupled to the at least one processor, the memory having instructions that, when executed by the processor, causes the at least one processor to function as:

a first acquisition unit configured to acquire a first position information about a vehicle, the first position information being estimated in accordance with input information from a first sensor and input information from a second sensor, the first sensor and the second sensor being fixed to the vehicle;

a second acquisition unit configured to acquire a second position information about the vehicle, the second position information being estimated in accordance with the input information from the second sensor, the second sensor being less reliable than the first sensor;

a selection unit configured to select a position information for controlling movement of the vehicle from the first position information and the second position information according to a same coordinate system;

a difference acquisition unit configured to acquire difference information between the first position information and the second position information acquired simultaneously with the first position information, the difference information being according to the same coordinate system; and an update unit configured to, when the position information selected by the selection unit is switched from the first position information to the second position information, the difference information acquired at the time of switching is continuously used as an offset to update the second position information until the first position information is reselected, wherein the first position information expected to be estimated by using the first sensor before switching is calculated by using the second position information estimated by using the second sensor after the switching and the difference information, an integration unit configured to integrate the first position information and the updated second position information by weighted averaging when the position information selected by the selection unit is switched from the second position information to the first position information, wherein the weighted averaging is performed so that the weight assigned to the first position information gradually increases over time.

11. A method comprising:

acquiring a first position information about a vehicle, the first position information being estimated in accordance with input information from a first sensor fixed to the vehicle;

acquiring a second position information about the vehicle, the second position information being estimated in accordance with input information from a second sensor fixed to the vehicle, the second sensor being less reliable than the first sensor;

selecting a position information for controlling movement of the vehicle from the first position information and the second position information according to a same coordinate system;

acquiring difference information between the first position information and the second position information acquired simultaneously with the first position information, the difference information being according to the same coordinate system; and updating, when the selected position information is switched from the first position information to the second position information using the difference information acquired at the time of switching is continuously used as an offset to update the second position information, until the first position information is reselected, wherein the first position information expected to be estimated by using the first sensor before switching is calculated by using the second position information estimated by using the second sensor after the switching and the difference information, integrating the first position information and the updated second position information by weighted averaging when the position information selected by the selecting is switched from the second position information to the first position information, wherein the weighted averaging is performed so that the weight assigned to the first position information gradually increases over time.

12. The method according to claim 11, further comprising selecting, in accordance with the first position information and the second position information that are acquired before the position information is switched to the other position information, a combination of position information targeted for difference acquisition and acquiring the difference information in accordance with the selected combination of position information.

13. The method according to claim 11, wherein the selecting includes selecting the first position information with priority, and
selecting the acquired second position information when the acquiring fails to acquire the first position information.

14. A method comprising:

acquiring a first position information about a vehicle, the first position information being estimated in accordance with input information from a first sensor and input information from a second sensor, the first sensor and the second sensor being fixed to the vehicle;
acquiring a second position information about the vehicle, the second position information being estimated in accordance with the input information from the second sensor, the second sensor being less reliable than the first sensor;
selecting a position information for controlling movement of the vehicle from the first position information and the second position information according to a same coordinate system;
acquiring difference information between the first position information and the second position information acquired simultaneously with the first position information, the difference information being according to the same coordinate system; and
updating, when the selected position information is switched from the first position information to the second position information, the difference information acquired at the time of switching is continuously used as an offset to update the second position information, until the first position information is re-selected, wherein the first position information expected to be estimated by using the first sensor before switching is calculated by using the second position information estimated by using the second sensor after the switching and the difference information, integrating the first position information and the updated second position information by weighted averaging when the position information selected by the selecting is switched from the second position information to the first position information, wherein the weighted averaging is performed so that the weight assigned to the first position information gradually increases over time.

15. A vehicle configured to be controlled with respect to movement by an apparatus, wherein the apparatus includes
at least one processor; and
a memory coupled to the at least one processor, the memory having instructions that, when executed by the processor, causes the at least one processor to function as:
a first acquisition unit configured to acquire a first position information about a vehicle, the first position information being estimated in accordance with input information from a first sensor fixed to the vehicle,
a second acquisition unit configured to acquire a second position information about the vehicle, the second position information being estimated in accordance with input information from a second sensor fixed to the vehicle, the second sensor being less reliable than the first sensor,

a selection unit configured to select a position information for controlling movement of the vehicle from the first position information and the second position information according to a same coordinate system,
a difference acquisition unit configured to acquire difference information between the first position information and the second position information acquired simultaneously with the first position information, the difference information being according to a same coordinate system, and
an update unit configured to, when the selected position information is switched from the first position information to the second position information, the difference information acquired at the time of switching is continuously used as an offset to update the second position information until the first position information is re-selected, wherein the first position information expected to be estimated by using the first sensor before switching is calculated by using the second position information estimated by using the second sensor after the switching and the difference information, an integration unit configured to integrate the first position information and the updated second position information by weighted averaging when the position information selected by the selection unit is switched from the second position information to the first position information, wherein the weighted averaging is performed so that the weight assigned to the first position information gradually increases over time.

16. A non-transitory computer-readable storage medium storing therein a program for causing a computer to perform a method, the method comprising:

acquiring a first position information about a vehicle, the first position information being estimated in accordance with input information from a first sensor fixed to the vehicle;
acquiring a second position information about the vehicle, the second position information being estimated in accordance with input information from a second sensor fixed to the vehicle, the second sensor being less reliable than the first sensor;
selecting an element position information for controlling movement of the vehicle from the position information and the second position information according to a same coordinate system;
acquiring difference information between the first position information and the second position information acquired simultaneously with the first position information, the difference information being according to the same coordinate system; and
updating, when the selected position information is switched from the first position information to the second position information, the difference information acquired at the time of switching is continuously used as an offset to update the second position information until the first position information is re-selected, wherein the first position information expected to be estimated by using the first sensor before switching is calculated by using the second position information estimated by using the second sensor after the switching and the difference information, integrating the first position information and the updated second position information by weighted averaging when the position information selected by the selecting is switched from the second position information to the first position information, wherein the weighted averaging is performed so that the weight assigned to the first position information gradually increases over time.

17. The non-transitory computer-readable storage medium according to claim 16, further comprising selecting, in accordance with the first position information and the second position information that are acquired before the position information is switched to the other position information, a combination of position information targeted for difference acquisition and acquiring the difference information in accordance with the selected combination of position information.

18. The non-transitory computer-readable storage medium according to claim 16, wherein the selecting includes selecting the first position information with priority, and selecting the acquired second position information when the acquiring fails to acquire the first position information.

19. A non-transitory computer-readable storage medium storing therein a program for causing a computer to perform a method, the method comprising:

acquiring a first position information about a vehicle, the first position information being estimated in accordance with input information from a first sensor and input information from a second sensor, the first sensor and the second sensor being fixed to the vehicle;

acquiring a second position information about the vehicle, the second position information being estimated in accordance with the input information from the second sensor, the second sensor being less reliable than the first sensor;

selecting a position information for controlling movement of the vehicle from the first position information and the second position information according to a same coordinate system;

acquiring difference information between the first position information and the second position information acquired simultaneously with the first position information, the difference information being according to the same coordinate system; and updating, when the selected position information is switched from the first position information to the second position information, the difference information acquired at the time of switching is continuously used as an offset, to update the second position information until the first position information is re-selected, wherein the first position information expected to be estimated by using the first sensor before switching is calculated by using the second position information estimated by using the second sensor after the switching and the difference information, integrating the first position information and the updated second position information by weighted averaging when the position information selected by the selecting is switched from the second position information to the first position information, wherein the weighted averaging is performed so that the weight assigned to the first position information gradually increases over time.

* * * * *